US012771598B2

(12) United States Patent
Cherrington

(10) Patent No.: US 12,771,598 B2
(45) Date of Patent: Oct. 20, 2026

(54) APPARATUSES AND METHODS FOR FACILITATING MODIFICATIONS IN NETWORKS AND SYSTEMS, ACCOUNTING FOR THE COST OF ENACTING CHANGE ACROSS MULTIPLE TIME SCALES

(71) Applicant: CIENA CORPORATION, Hanover, MD (US)

(72) Inventor: John Wade Cherrington, Salt Spring Island (CA)

(73) Assignee: CIENA CORPORATION, Hanover, MD (US)

( * ) Notice: Subject to any disclaimer, the term of this patent is extended or adjusted under 35 U.S.C. 154(b) by 5 days.

(21) Appl. No.: 18/595,505

(22) Filed: Mar. 5, 2024

(65) Prior Publication Data

US 2025/0286780 A1 Sep. 11, 2025

(51) Int. Cl.
*G06F 15/177* (2006.01)
*H04L 41/0826* (2022.01)
*H04L 43/08* (2022.01)

(52) U.S. Cl.
CPC .......... *H04L 41/0826* (2013.01); *H04L 43/08* (2013.01)

(58) Field of Classification Search
None
See application file for complete search history.

(56) References Cited

U.S. PATENT DOCUMENTS 7,130,807 B1 * 10/2006 Mikurak .......... G06Q 10/06375 705/7.31
7,315,826 B1 * 1/2008 Guheen .............. G06Q 30/0201 705/7.29
10,756,970 B1 8/2020 Hermoni et al.
10,936,462 B1 * 3/2021 Eardley ............... G06F 11/0772
11,003,179 B2 * 5/2021 Cella ...................... G06Q 30/02
11,199,837 B2 * 12/2021 Cella ...................... G06N 5/046
2004/0221038 A1 * 11/2004 Clarke, Jr. .............. H04L 43/00 709/201
2012/0331115 A1 12/2012 Narain et al.
2021/0258808 A1 8/2021 Mahimkar et al.
2024/0284185 A1 * 8/2024 Montalvo .............. G06N 20/00

OTHER PUBLICATIONS

"Dependability planning of telecommunication networks", E.862; ITU-T Standard in Force (I), International Telecommunication Union, Geneva, CH, Jun. 16, 1992, 15 pages.
"International Search Report and Written Opinion for Application No. PCT/US2025/015975", May 6, 2025, 13 pages.

* cited by examiner

*Primary Examiner* — Phuoc H Nguyen
(74) *Attorney, Agent, or Firm* — Guntin & Gust, PLC; Mark Wilinski

(57) ABSTRACT

Aspects of the subject disclosure may include, for example, obtaining parametric data, analyzing the parametric data to identify a non-ideality with respect to a configuration of a network, performing, based on the analyzing of the parametric data, a cost-of-change analysis to identify whether one or more changes to the configuration of the network are warranted, and based on the performing of the cost-of-change analysis indicating that at least one change of the one or more changes is warranted, modifying the configuration of the network, the modifying resulting in a modified configuration of the network that is different from the configuration of the network. Other embodiments are disclosed.

20 Claims, 5 Drawing Sheets

300

100a

300

500

APPARATUSES AND METHODS FOR FACILITATING MODIFICATIONS IN NETWORKS AND SYSTEMS, ACCOUNTING FOR THE COST OF ENACTING CHANGE ACROSS MULTIPLE TIME SCALES

FIELD OF THE DISCLOSURE

The subject disclosure relates to apparatuses and methods for facilitating modifications in networks and systems, accounting for the cost of enacting change across multiple time scales.

BACKGROUND

As the world increasingly becomes connected via vast communication networks and systems and via various communication devices, additional opportunities are created/generation to provision communication services. Network/System operators and service providers engage in activities/operations aimed at enhancing resiliency and efficiency. A typical approach to network/system optimization seeks to make the optimal choice of design variables under nominal operating conditions. For fixed capacity, a typical traffic engineering optimization will determine how traffic/load should be split among one or more source-destination paths.

As referenced above, a well-known extension of optimization accounts for resiliency (sometimes also called survivability). As part of considering resiliency, stresses may be imposed in terms of impairments or unexpected demand patterns, with an analysis being undertaken to determine/identify how the network/system performs in the presence of such stresses. In this setting, a common default way to accommodate the totality of simulated failure and/or demand anomalies is to add spare capacity relative to a baseline/reference design configuration, sized according to the worst-case analyzed scenario. However, adding spare capacity in this manner potentially represents inefficiencies, particularly if the stresses rarely appear or if their impact is relatively minor.

As traffic/load (e.g., internet traffic) continues to grow and infrastructure provisioning operations become more sensitive to supply-chain risks and energy costs, there is an increasing interest in using what networking capacity is available more efficiently/adaptively/dynamically. In this setting, assuming a rapidly executable network/system routing change could be planned and smoothly enacted, latent lower-utilization capacity (e.g., in place or meant for future growth) could be used immediately to deal with a short-duration traffic anomaly, impairment or other operational challenges. Stated differently, as an alternative to the worst-case/spare capacity sizing described above, a plan could be formulated to actively steer network/system traffic flows in the event of a stress condition using a smaller level of reserve, with that reserve itself being useful for future steady-state growth. While effective, this could result in a scenario of "a dog chasing its tail" in the sense that a network/system operator or service provider may be placed into a mode of having to "play catch-up" in response to the next stress-based event, condition, or occurrence.

BRIEF DESCRIPTION OF THE DRAWINGS

Reference will now be made to the accompanying drawings, which are not necessarily drawn to scale, and wherein.

DETAILED DESCRIPTION

Figure 1B:
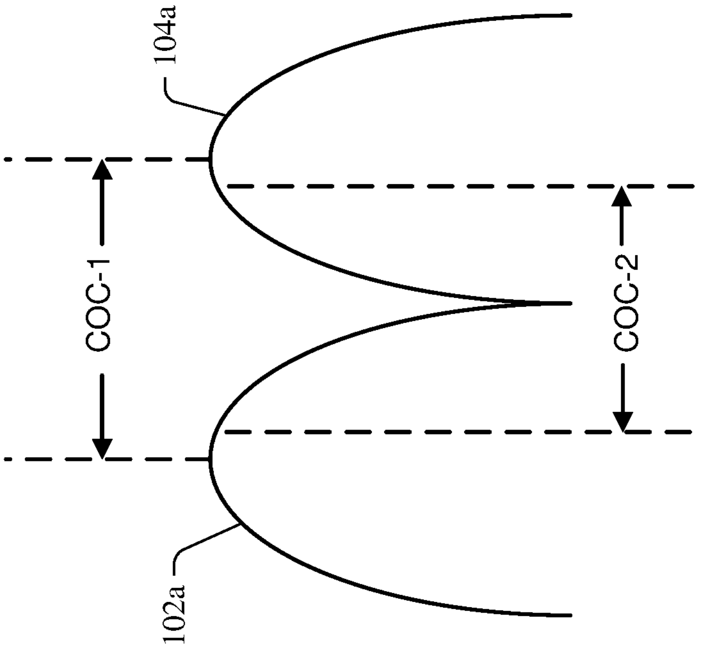
FIGS. 1A and 1B are diagrams illustrating variations in terms of performance of a network or system in accordance with various operating conditions.

The subject disclosure describes, among other things, illustrative embodiments for facilitating modifications in networks and systems, accounting for the cost of enacting change (or "cost-of-change" for short) across multiple time scales. Other embodiments are described in this disclosure.

One or more aspects of the subject disclosure include, in whole or in part, obtaining parametric data; analyzing the parametric data to identify a non-ideality with respect to a configuration of a network; performing, based on the analyzing of the parametric data, a cost-of-change analysis to identify whether one or more changes to the configuration of the network are warranted; and based on the performing of the cost-of-change analysis indicating that at least one change of the one or more changes is warranted, modifying the configuration of the network, the modifying resulting in a modified configuration of the network that is different from the configuration of the network.

One or more aspects of the subject disclosure include, in whole or in part, determining, by a processing system including a processor, a probability of each stress of a plurality of stresses occurring within a communication network or system; determining, by the processing system, an impact of each stress of the plurality of stresses on a performance of the communication network or system if the stress was to occur within the communication network or system; determining, by the processing system, a likely duration of each stress of the plurality of stresses if the stress was to occur within the communication network or system; selecting, by the processing system and based on the probability of each stress occurring within the communication network or system, the impact of each stress if the stress was to occur within the communication network or system, and the likely duration of each stress if the stress was to occur within the communication network or system, a configuration for the communication network or system from among a plurality of configurations; and configuring the communication network or system in accordance with the configuration.

One or more aspects of the subject disclosure include, in whole or in part, determining that a stress has been imposed on operations of a network, resulting in a first determination, wherein the stress is based on an impairment of a first resource of the network, an increase in demand in respect of a second resource of the network, or a combination thereof; analyzing, based on the first determination, a cost of changing a configuration of the network from a first configuration to a second configuration that is different from the first configuration, wherein the second configuration would mitigate an impact of the stress on a performance of the network over a first time scale, and wherein the second configuration would harm the performance of the network relative to the first configuration over a second time scale that is different from the first time scale; and determining, based on the cost, whether to modify the configuration of the network from the first configuration to the second configuration, resulting in a second determination.

By way of introduction, it is appreciated that, conventionally, active resilient response has been an ambition under the general area of traffic engineering as applied to engineered responses at a given layer—e.g., Layer 3 of a communication network or system. In some cases/scenarios, principles of resiliency may be extended to a multilayer response (i.e., a multilayer response in elastic optical networks). Within this line of reasoning, several questions may emerge that don't appear to have a well-developed answer within conventional optimization frameworks. Principles of cost-of-change as described herein may be applied to answer those questions. The questions that may be posed may include:

(1) Response decision, demand anomaly/spike: Some network/system stresses may not persist long enough to merit an effective response in time to make a difference—an example being a traffic anomaly. How does a controller (or the like) decide what solution to implement, if any, based on a presented condition and one or more possible candidate solutions or configurations? If a response threshold is selected to be too low, the network/system may become unstable due to delays and uncertainties in measurements and delay and transient conditions in the response. If the response/solution takes more than a threshold amount of time to be implemented, the solution may not demonstrate much improvement relative to the state/condition of taking no action at all.

(2) Response decision, traffic trend response: Some stresses may become gradually worse over time. If a forecast begins to indicate a threshold will be reached or crossed, at what point does the controller decide an intervention is justified?

(3) Resource release timing: As described above, some network/system responses may draw on capacity (e.g., resource capacity) that was initially allocated to address future growth. Ideally, depending on the persistence of an unexpected stress, some or all of the capacity should be released to support the growth plan; alternatively, the growth plan may need to be adjusted to account for a persistent anomaly, a slow-to-repair impairment, or an area of a network/system that is at particular risk of anomaly. This naturally then begs the question of how to properly allocate resources to addressing immediate needs relative to future needs?

(4) Resource and time cost of optimization: Exact optimization (provably establishing a global optimum) is generally not achievable on a given, modern network or system of practical size/scale. Given this, there is a trade-off between time-of-response and time to find a "good enough" optimization (e.g., an optimization that satisfies a threshold representative of a quality of the response). To some finite depth, pre-computed optimizations may be made in advance with respect to simulated scenarios. But a question that arises in this context is what criteria can be used to determine how compute resources should be divided between online (local search) and offline (deep search) and sized or focused on different scenarios?

(5) Multilayer Resiliency trade-offs: In active controllers that can act on Layer 3 and on transport layers (e.g., Layer 0 photonics), a question that may be posed may include how can the interrelated use of path diversity and choice of link topology be engineered to provide potentially class-differentiated resiliency to network/system demands that meet response time and related quality of service (QoS) or quality of experience (QoE) specifications?

Aspects of this disclosure may be used to address the questions posed in (1)-(5) above. Indeed, the questions posed above may be incorporated or integrated as part of a topology or configuration that moves or allocates traffic/load in response to observed conditions. The answers to the questions may provide solutions to the challenge of attempting to provide a stable and effective controller that is tasked with providing timely and accurate/quality responses to stresses as part of one or more networks or systems.

With the foregoing in mind, it is appreciated that the questions posed above (as well as other intersecting or related questions omitted herein for the sake of brevity) may call for a quantification in terms of how to rationally determine/identify cost in terms of a choice of a network/system change relative to original or general criteria being optimized. Within a framework of a larger optimization, generally a penalty associated with a cost-of-change may be reflected or represented in two dimensions, although the way they are mixed may differ situationally, and in some cases their relative weights may be adjusted as one may be more pronounced than the other. These two dimensions may be referred to as (1) impact and (2) time-to-realize.

The (1) impact dimension may correspond to, or include, expected and potential consequences under some risk model. To convey/move traffic/load on/about a network or system, there may be a sequence of element changes that are executed. For a given change-plan, the worst-case impact would be a failure at a point that leaves the network/system with a greatest performance drop (by some established measure) relative to a baseline/reference point. This may include optical changes that may be incurred during a particular re-grooming or shifting of optical services following a fiber cut, for example.

The (2) time-to-realize dimension may correspond to, or include, the time the network or system spends operating in a degraded state. Generally speaking, it may be a goal of a network/system operator or service provider to reduce (e.g., minimize) the amount of time spent operating in the degraded state. At some point in the decision-making paradigm, a very low-impact change may be preferred if the time to execute a more-impactful change is longer/greater.

It may be assumed that cost-of-change dimensions referenced above may be represented as part of one of two models or frameworks, with the understanding that in a given embodiment there may be a blending between the two models/frameworks. These models or frameworks may be referred herein as a (1) standard baseline optimization with cost-of-change as a re-optimization filter, and (2) feed-forward of the cost-of-change into the optimization. These two models/frameworks are described in greater detail below.

In terms of the (1) standard baseline optimization with cost-of-change as a re-optimization filter approach, a baseline operating point may be generated or obtained without consideration for cost-of-change. When a real or simulated stress (e.g., impairment or demand anomaly) occurs, a controller may apply a "cost" to transacting a change to bring the network/system from its current state to a new operating point (which may be the same as, or different from, the baseline). If the cost is too high (e.g., exceeds a threshold) relative to the available options, the controller may disallow the change. If the cost is reasonably efficient to compute and/or implement, filtration could be used to restrict the options to a more focused area around the current state/operating point.

In terms of the (2) feed-forward of the cost-of-change into the optimization approach, a network or system may be considered in which fiber (or other equipment) failure occurs regularly in certain identifiable parts or portions of the network/system. Intuitively, it does not make sense to choose a baseline operating point that assumes no failure, but rather one that is able to meet a good-enough performance as fibers are failed and repaired. With cost-of-change quantified, it is possible to choose a baseline close to a no-stress baseline, but which is representative of a lower cost-of-change to traffic/load adjustments for those modes or instances of failure that are known to regularly occur. In this respect, aspects of this disclosure may be applied to, and integrated as part of, practical applications involving real-world networks and systems that are subject to certain known or predictable modes of stress; this may be contrasted with an approach that naively assumes perfection, or a gold-standard, as a starting point or baseline.

Figure 1A:
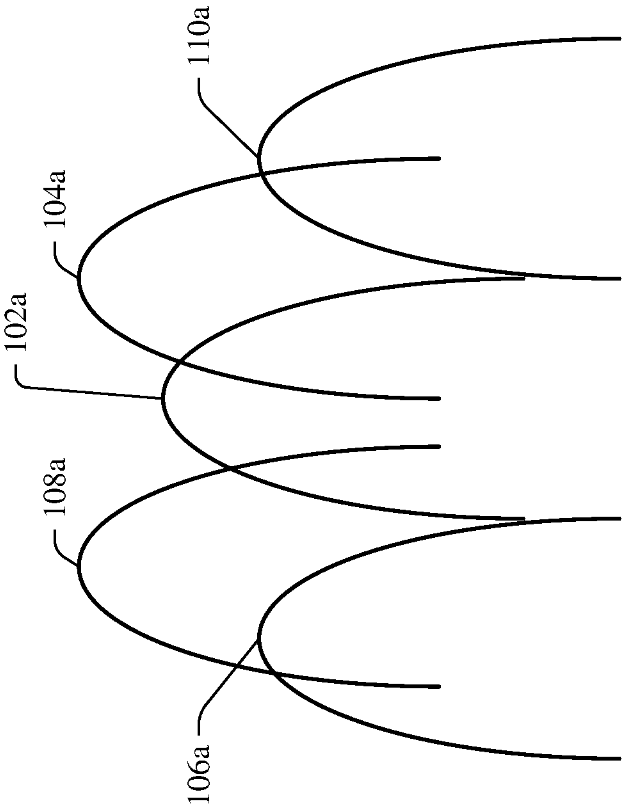

With the foregoing in mind, and with reference to FIG. 1A, a depiction of various operating points 100*a* of a network or system under various conditions is shown. In particular, a number of the operating points are represented by reference character curves 102*a*, 104*a*, 106*a*, 108*a*, and 110*a*. Each of the curves 102*a* through 110*a* may be associated with a particular condition (such as no-stress condition 102*a*, a failed fiber link condition 104*a*, a failed transmitter 106*a*, etc.), or analogously a set of a plurality of conditions. The respective peak of each of the curves 102*a* through 110*a* in FIG. 1A may be representative of a local maximum, which may be representative of optimal or best performance for that condition (or set of conditions).

Referring to FIG. 1B, features of a relationship between the curves 102*a* and 104*a* are shown in greater detail. It should be noted that while FIG. 1B refers to the curves 102*a* and 104, any two (or more) curves could have been considered as part of FIG. 1B without loss in accuracy in respect of the description that follows.

Superimposed in FIG. 1B between the curves 102*a* and 104*a* is a reference character COC-1 that serves as a representation of the cost-of-change in transitioning from the maximum/peak of the curve 102*a* to the maximum/peak of the curve 104*a* (or vice versa). Also shown is another reference character COC-2 that serves as a representation of the cost-of-change in transitioning from a non-maximum location along the curve 102*a* to a non-maximum location along the curve 104*a* (or vice versa). Assuming that the condition (e.g., a failed fiber link) associated with the curve 104*a* occurs somewhat regularly or frequently, and again assuming that the curve 102*a* is representative of a no-stress condition/situation, it may be the case that under the totality of the circumstances that a network/system operator or service provider would prefer to operate the associated network/system under the conditions of the curve 102*a* at the point along the curve 102*a* coinciding with the intersection of the curve 102*a* with COC-2 (as opposed to at the local maximum of the curve 102*a*—coinciding with the intersection of the curve 102*a* with COC-1). This somewhat counterintuitive behavior/result (e.g., knowingly or willingly operating at less than optimum performance) may be justified/warranted if, for example, the cost-of-change COC-1 is "significantly large" (e.g., is greater than a threshold) relative to the cost-of-change COC-2.

Returning to the five (5) questions posed above, answers to those questions may be provided as follows:

(1) Response decision, demand anomaly/spike: In view of the time-to-realize dimension/window, responses that take longer to implement than the expected persistence of an anomaly or stress may be eliminated/discarded. Eliminating or discarding of such responses may be immediately and readily applied in respect of the (1) standard baseline optimization with cost-of-change as a re-optimization filter approach described above. In terms of the (2) feed-forward of the cost-of-change into the optimization approach, an adjusted baseline may be adopted that is close (e.g., within a threshold) of what might be termed classically optimal (e.g., what provides maximum performance) while being positioned in a way that facilitates a short-time/low-impact response to high-probability stresses.

(2) Response decision, traffic trend response: If confidence is present in respect of a well-characterized/well-defined trend, consideration may be given to all changes within the time-to-realize dimension/window, with a focus on reducing (e.g., minimizing) impact of changes, possibly by spreading several changes out or scheduling such changes as part of a proximal maintenance window or low-demand/low-traffic time of day.

(3) Resource release timing: Similar to a gradual degradation, an unwinding of a short-term response to a stress may be scheduled so that the unwinding occurs in time for medium or longer-term planned commitments of capacity to satisfy expected demand growth. The possible trajectories of scheduling/un-scheduling the response can be viewed as a trajectory enhancement (e.g., optimization) with both classical cost function(s) and the cost-of-change accounted for.

(4) Resource and time cost of optimization: With a model that gives impact and time-to-realize of a prospective change, it is possible to create a time budget in which some of the time is spent in computing a local enhanced (e.g., optimized) response, with each considered change assigned its own time-to-realize parameter or requirement. In terms of the (1) standard baseline optimization with cost-of-change as a re-optimization filter approach, as the total time window closes following an event, only shorter duration changes may be considered (e.g., longer duration changes may be eliminated or discarded as time advances). In terms of the (2) feed-forward of the cost-of-change into the optimization approach, consideration may be given to longer-duration responses (but potentially omitting those that violated an implementation window target), since the enhancement (e.g., optimization) time is incurred ahead of time (e.g., at certain level of k-cut).

(5) Multilayer Resiliency trade-offs: It may be argued/asserted that the gold standard of resiliency would be event-based simulation using event rates informed by known shared risks and their occurrence rate. Under such an assumption, the time to realize different responses, and the transient impact changes have during execution, may be part of evaluating different network/system adaptation trajectories. Tasks may then be reduced to a choice or selection of an operating point (e.g., an optimal operating point) and change trajectories under different stresses/stress scenarios.

Conventionally, longer-term network/system adaptations are handled as part of "planning operations" and shorter-term adaptations are handled as part of "management operations", with relatively few practical attempts to fully close the cycle in a way that provides for strategies for bringing shorter-term observations and local adaptations into longer term plans, or for staging longer-term planned capacity in a way that provides flexibility to shorter term adaptations. An analysis incorporating cost-of-change provides a mechanism of viewing network/system realized and target states not so much as points in isolation, but as a trajectory to be optimized, with the details of the trajectory informed by any original performance or resiliency objectives previously considered, combined with a cost-of-change model that reduces (e.g., minimizes) network/system disruption and limits excessive time-to-recompute by trimming a search space to those candidate changes that satisfy time and impact demands. In this respect, cost-of-change may be viewed as a keystone piece that rationalizes many aspects of in-network planning that were previously seen as qualitative problems but lacked a quantified basis. In this regard, cost-of-change may be used as a tool to drive decision-making processes and logic. Such a tool may be utilized in connection with machine learning (ML) and/or artificial intelligence (AI) based technologies to proactively identify and quantify risk and formulate strategies in view of the same.

In some instances, optimization metrics may have a direct translation to "dollars and cents". In more multi-objective and multi-component (e.g. multilayer and multi-timescale in-network planning) contexts, some element(s) of the optimization can be given/assigned a monetary basis, while other element(s) have a cost model that is too ambiguous, complex, or private to be explicitly monetized. In general, as used herein the term "cost" (as potentially applied in respect of cost-of-change) may be used to capture the totality of all relative preferences in a tradeoff space that includes purchased equipment, risk of losing customers/subscribers, business impact of degraded services, regulatory and management-based risk(s) of expensive or urgent repairs, and so on.

A framework of this disclosure may allow: (a) explicitly monetizable costs to be incorporated, and (b) non-monetizable costs to be given weights relative to each other and to the monetizable costs. In a typical workflow, a user (or, analogously, a device) may execute several scenarios with different weighted preferences to see what improvements/differences in network/system metrics of interest come out. A selection may then be made in view of the same.

As noted above, a sharp or explicit monetary cost model might not be available (or such a model may fail to incorporate other types or kinds of cost/risk). However, aspects of this disclosure include a framework where additional details can be brought to bear on the analysis than is standard/typical in optimization and design practices that are in common use. To properly understand this framework, it is necessary to understand the multiple time scales of network/system response to stress-due to specializations in technology and training, these are not often analyzed simultaneously; and more to the point their relations and tradeoffs are not well captured or allowed to interact. To demonstrate, a network or system that is being optimized for its performance through time under both nominal operating conditions as well as in a probability space of stress scenarios (e.g. equipment failure (such as a fiber cut), demand shock, etc.) may be considered. As part of this network or system:

(a) Based on k-cut and robust traffic forecasts that consider tail events, (layer 3 (L3)) capacity may be oversized/added to handle all expected stresses. Alternatively, such capacity may be added in some portions/parts of the network/system while relying on other mechanisms in other portions/parts of the network system.

(b) At L3, a tactical traffic engineering response may be provided depending on the nature or details of the stress(es) at hand. As stated above, the cost-of-change implicates the time to decide and execute this re-engineering, along with any transient impairments added during re-provisioning procedures. Based on service priority and impact, the tactical engineering response may work in tandem with (a) above-namely, oversizing or adding capacity in some portions/parts, and relying on a tactical engineering response in other portions/parts.

(c) In a scenario where the stress(es) include a fiber cut (as an example), a stranded transponder may be utilized to place additional capacity-potentially in combination with (b) above. Such a response may likely be implemented at a comparable time scale to (b), and so it makes sense to consider it as part of (b). However, when fiber is restored, there is an additional adjustment away from the temporary layer 3-layer 0 (L3-L0) joint solution to the baseline configuration, so some consideration for that change may need to be made to choose the best overall use of the stranded transponder.

(d) Spare optical capacity intended for future expansion may be activated. The time scales of this response type may be comparable to (b) and (c) above, so the use of spare capacity can be included as part of an overall mitigating response. However, as referenced above, when using a spare there is a question of its release back to its original intended purpose. As such, this calls for an analysis of how long the spare is expected to be needed for the stress condition, and upon switching back to original use/allocation what will the traffic growth and hence impact of that change back be.

(e) Upon enacting (d) above, an order of incoming network/system upgrades/enhancements may be scheduled or re-scheduled/adjusted in considering observed stresses (e.g., failures) and any associated repair times/durations. With an awareness of a current ordering of activities, and what impedances and affordances it has/provides to adjustments, strategies can be developed to facilitate the switch-back/restoration associated with points (b) through to (d) above.

(f) Under supply chain risk (which can affect both availability as well as cost to source), some equipment may have uncertainty associated therewith, such as in relation to delivery dates and cost. Incorporating risk models in respect of the supply chain may facilitate decision-making in respect of point (e) above.

In general, as fastest responses play-out or are implemented, an off-nominal network/system may reach a different operating point from which further adaptation to current, new, future, or original circumstances can play-out based on statistical models of risk and expected restore times and demand shocks. Choosing from among the possible responses involves trading off the in-the-moment enhanced (e.g., best or optimal) possible network/system behavior versus considering the time spent in mitigating and restoring windows where network/system will incur degraded or lower performance.

Noting that the chained set of conditions, stresses, and responses often manifest themselves as part of, or along, a cascade of time scales, this often results in a multiple time scale, multiple layer optimization problem that can be conceptualized as optimizing a risk-adjusted trajectory through time. Understanding the latency relative to pay-off/improvement of one or more tactical responses, considering the failure/impairment rate and repair time of one piece of equipment (e.g., fiber) versus another, and knowing the expected time to ship a spare or replace a failed/impaired component or device (e.g., a circuit board or card) may facilitate establishing time scales of response that allow a user or customer/subscriber experience of the network/system to be measured under different management or risk scenarios. Accordingly, decision-making processes or logic may be configured or constructed to accommodate such scenarios. Thus, aspects of this disclosure are directed to a structure for facilitating a cost-of-change platform that incorporates a risk-weighted and time-weighted impairment penalty to the user experience. Once quantified and accounted for, appropriate tradeoffs may be made in respect of available solutions and the costs involved.

To further demonstrate aspects of this disclosure by way of example, it may be assumed that there is a disturbance or stress, in the form of a large and sudden increase/spike in demand, that occurs each day in respect of a network. Outside of this disturbance/stress, it may be assumed the network is well optimized with low congestion. It may be the case that to deal with this demand spike using traffic engineering, some highly critical services are brought close to their guaranteed quality or operating thresholds as part of the response. A steep penalty for facilitating a changed route may be incurred, even though the demand spike only occurs for a small fraction/part of the day. Taken together, the collective of the various factors may suggest that it is better to oversize some of the links involved, rather than form or rely upon a tactical response. However, on a different network (e.g., a second network), or a different portion of the network in question, it may be that another disturbance scenario can be very well handled by a tactical response without disrupting any sensitive services; in such instances, oversizing capacity might not be needed. A similar consideration applies when there is a frequently failing fiber; in that instance an analogous decision may be encountered in terms of where and when to use a reactive tactical approach relative to an over-size strategy.

Even when critical services are not involved, there is also a decision about whether to “chase every spike” or anomaly with an adjustment, given that many adjustments involve an associated, transient performance hit. A cost-of-change analysis of the type described above can help, potentially alongside or in conjunction with an anomaly forecaster that predicts the length and impact of an anomaly. All other conditions being assumed equal, an anomaly that is forecast to persist long enough (e.g., for a duration greater than a threshold) may justify adjustment, whereas shorter anomalies (e.g., anomalies that are of a duration less than a threshold) may not. Similarly, when traffic demand forecasters predict longer-scale structural shifts in demand away from what was forecast during a planning stage, decisions on what rate and timing to schedule adjustments can be made explicitly using cost-of-change models.

In accordance with aspects of this disclosure, the sub-optimality of one-size-fits all resiliency strategies is recognized. Rather, depending on the particular facts or circumstances, it may be preferable in some cases to: over-size capacity (or other resources), provide a tactical engineering response, do nothing (if, for example, the nature of a stress is one of short duration and/or low impact), etc. On longer time scales, network/system evolution/upgrade plans may be structured to absorb and reflect an evolving understanding of conditions and risks. Navigating this space of mixed responses is made possible by a standard cost-of-change for each mechanism as a function of condition, and then trading that against standard network/system performance objectives.

The decision to protect a particular service (or set of services) may serve as a cornerstone in a communication network or system framework, as it reflects a non-negotiable level of resiliency. As a hard requirement for that service, there may be limited interaction (beyond resource reservation) with a remainder of an optimization problem as there are no tradeoffs to make. In frameworks described above, this tier of protection can be thought of prior/upstream relative to a multiple time scale cascade. As such, automatic/automated protection mechanisms are highly compatible with the general framework as follows:

(1) Under stresses (e.g., fiber cuts) that are recoverable by the protection mechanisms, optimization may play a role in which, once resources have been set aside/established/allocated for services needing such stringent protection, the question may be posed as to how to enhance (e.g., maximize) the experience for all other traffic.

(2) For all protected services, but under stresses that are not recoverable by the protection mechanism, the cost-of-change framework may be utilized to facilitate user or device preferences to be represented at the next time scale level of recovery.

(3) From an implementation perspective, cost-of-change techniques set forth herein may understand/comprehend the automatic protection mechanism behavior to simulate the full range of scenarios, involving mixtures of all mechanisms considered for use.

In accordance with aspects of this disclosure, cost-of-change may encompass any metric that is not necessarily based on start or end point state of an optimization/re-optimization problem standing alone, but on some quantification of the benefit, risk, penalty, or cost or other downside of making a change, potentially as a function of time. Typical examples would be services loss or jeopardy during a change, and/or the time and/or complexity of modifications needed to effectuate change.

Cost-of-change can offer an important criterion (typically as part of broader multi-objective optimization) to extend existing optimization frameworks and specifically can do so in two principal modes: (A) local or constrained usage of a cost-of-change, to help down-select or constraint choices within an existing global optimization strategy (as one of multiple objectives) where changes from a given baseline are being considered, and (B) a global “feed-forward” usage of a cost-of-change metric, where the baseline itself is selected so that likely failure modes have pre-optimized responses that include, among other objectives, the objective of reducing (e.g., minimizing) cost-of-change to the pre-optimized response from the baseline.

A high level but concrete summary of how the concepts come together in a generic network optimization situation is described as follows:

(1) an environment may be assumed where an existing optimization capability is minimizing a cost function of the form $C_0=\alpha_1 F_1(x_1, \ldots)+\alpha_2 F_2(x_1, \ldots +\alpha_N F_N(x_1, \ldots)$, in which optimization searches all admissible choices of variables x, . . . to find the lowest cost solution;

(2) a cost-of-change function $G(x_0, \ldots, x_1, \ldots)$ may be introduced that quantifies the cost to move from the current configuration $\{x_0, \ldots\}$ to any new configuration encoded by the variables $\{x, \ldots\}$.

(3) operating under mode A (local or constrained usage of a cost-of-change), existing search optimizations may be run/executed, but cost-of change may be included/incorporated as either a filter or contribution into the cost function. In this regard, $G(x_0, \ldots, x_1, \ldots)$ may be treated as a hard filter—e.g., if G exceeds threshold, the configuration may be rejected, or equivalently assigned an infinite weight. Alternatively, $G(x_0, \ldots, x_1, \ldots)$ may be treated as a best-effort preference—e.g., G may be added to the cost function $C_0$ to form new cost function $C_1=C_0+G(x_0, \ldots, x_1, \ldots)$ and depending on value of G the optimization may be guided to prefer lower cost-of-change solutions in proportion to how G is weighted relative to other weights $\{\alpha_1, \ldots, \alpha_N\}$.

(4) operating under mode B (a global "feed-forward" usage of a cost-of-change metric), a deeper shift may be made in how optimization is conceptualized and pursued. A setting/environment may be adopted where nominal conditions (all fibers and equipment are fully functional, all network demand exists within an expected range or envelope) have been observed to hold a particular percentage of the time $p_0$, but that commonly observed stress or failure modes occur in practice with probabilities $\{p_1, \mathbf{1}, p_2, \ldots\}$. Optimization may be performed not only at the nominal operating point, but also in conjunction with all the common stress/failure modes up to some probability cut-off/threshold. The choice made in respect of each operating point may involve the original design variables $\{x_1, \ldots\}$, and also terms of the form: $G(x^i_1, \ldots, x^j_1, \ldots)$. As such, the cost function that is to be optimized in mode B may be expressed as: C=(Sum over $C^i_0$ for nominal and all considered failure modes i)+(Sum for all pairs (i,j), the cost of change $G(x^i_1, \ldots, x^j_1, \ldots)$ to move from mode i to mode j, weighted by conditional probability of going from i to j).

In view of the foregoing, one skilled in the art will appreciate that a cost-of-change analysis may influence operating points associated with both nominal conditions, as well as stress conditions. Furthermore, rather than merely providing a qualitative overview of stress, aspects of this disclosure provide techniques for quantifying stress, which may more readily lend themselves to adoption/utilization (particularly in respect of machines that may lack the nuance or sophistication for responding adequately to qualitative characteristics).

Figure 2:
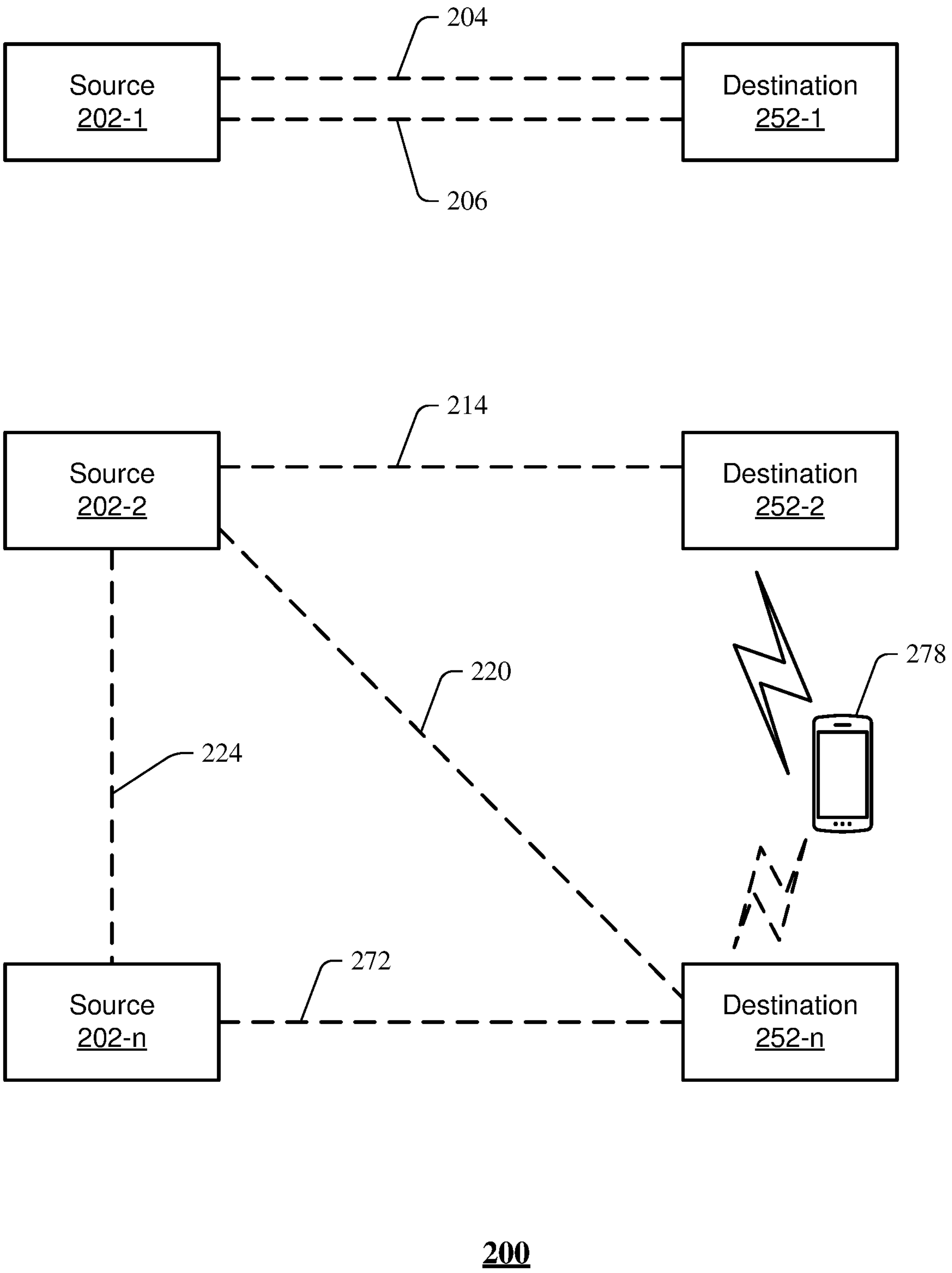
FIG. 2 depicts a block diagram of a system where cost-of-change analyses may be implicated in accordance with various aspects of this disclosure.

Referring to FIG. 2, an embodiment of a system 200 that may be used to demonstrate aspects of this disclosure, inclusive of aspects pertaining to cost-of-change, is shown. The system 200 may facilitate a transfer of data or information amongst one or more sources (e.g., a first source 202-1, a second source 202-2, . . . an $n^{th}$ source **202-*n*) and one or more destinations (e.g., a first destination 252-1, a second destination 252-2, . . . an $n^{th}$ destination 252-*n*). During nominal operating conditions it may be the case that the first source 202-1 and the first destination 252-1 are coupled to one another via a link 204, the second source 202-2 and the second destination 252-2 are coupled to one another via a link 214, and the $n^{th}$ source 202-*n* and the $n^{th}$ destination 252-*n* are coupled to one another via a link 272. The links 204, 214, and 272 may be implemented using any type or kind of technology and may correspond to any type or kind of medium. To demonstrate, the links 204, 214, and 272** may correspond to wireless links, wired links, optical links, etc., potentially as part of one or more networks or systems (e.g., a fiber network or system, a wireless network or system, etc.).

At some point during the data/information transfer operations, it may be the case that the operating conditions may change or vary. For example, it may be the case that a demand or load on/at the first destination 252-1 increases beyond a threshold and/or that the link 204 becomes partially or even wholly inoperable. Under such a scenario, conventionally another link 206 (e.g., a spare link) between the first source 202-1 and the first destination 252-1 that is available might be enabled/activated. However, the activation of the link 206 may cause an increase in coupling between the link 206 and the link 214, which may result in an unacceptable error rate (perhaps due to interference) being manifested in a communication service facilitated by the second destination 252-2 for the benefit of a user equipment (UE) 278. In view of the increase in the error rate involving the UE 278, a communication session associated with the communication service may be transferred or handed-over from the second destination 252-2 to the $n^{th}$ destination **252-*n* by way of a link 220 and/or a link 224**.

In accordance with aspects of this disclosure, an analysis involving cost-of-change might suggest alternatives that may have avoided or eliminated some of the changes described above. For example, if based on an analysis it was determined that the duration of the demand or load increase on/at the first destination 252-1 is likely to be of a short duration (e.g., less than a threshold) and/or that the duration of the impairment of the link 204 is expected to be short (e.g., less than a threshold), then the cost-of-change analysis may suggest doing nothing (e.g., not activating the link 206), or doing something else (e.g., causing UEs attached to the first destination 252-1 to execute a low-data version of an application to preserve resources—e.g., bandwidth-associated with the link 204, such that the link 204 can still accommodate services even when operating in a degraded/impaired state/condition). It may be the case that, a consumer/subscriber associated with the UE 278 (which may be representative of multiple UEs) may be an important customer (may be providing significant revenue to an operator of the system 200) and/or may be providing a critical service (such as, for example, first responder services), such that it might not be prudent to effectuate the transfer of the communication session involving the UE 278 described above.

As the foregoing example involving the UE 278 demonstrates, conventional network/system management operations may tend to be "knee-jerk" in nature and fail to properly account for an impact and duration of issues or conditions on multiple time scales and at multiple locations. In contrast, aspects of this disclosure, inclusive of aspects pertaining to cost-of-change, take a more wholistic and comprehensive view of such issues and conditions, such that the performance of the network/system over time is enhanced (e.g., is maximized).

Figure 3:
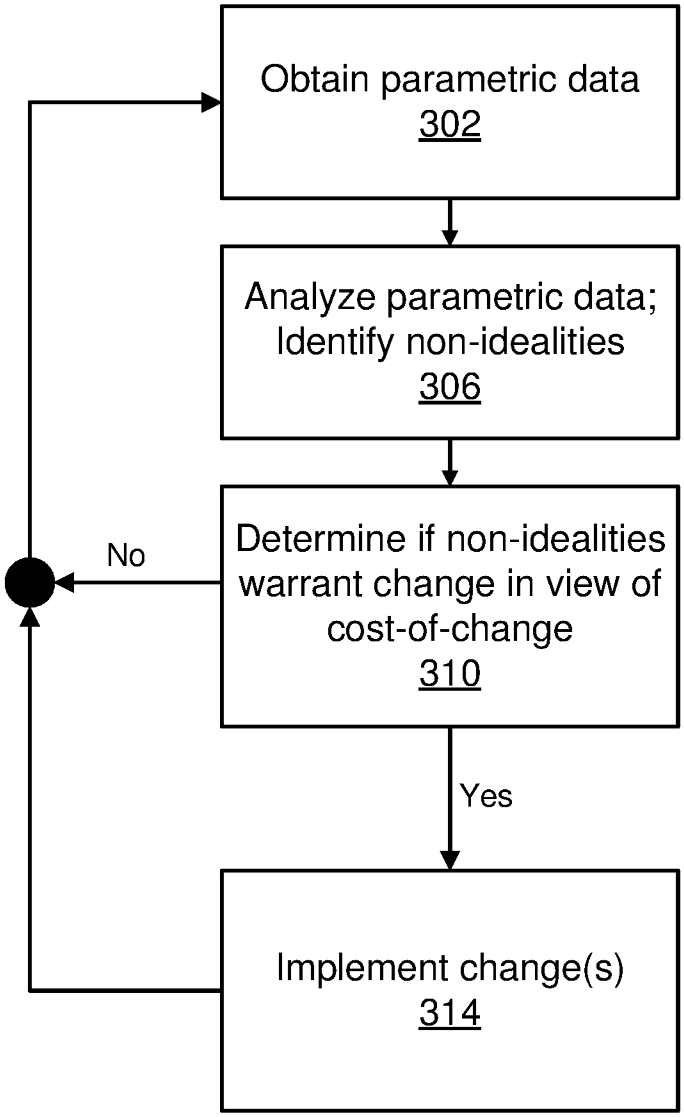
FIG. 3 depicts an illustrative embodiment of a method in accordance with various aspects described herein.

With reference now to FIG. 3, an illustrative embodiment of a method 300 in accordance with various aspects described herein is shown. The method 300 may be implemented (e.g., executed), in whole or in part, in conjunction with one or more systems, networks, devices, and/or components, such as for example the systems, networks, devices, and components described herein. The method 300 may facilitate a performance of operations, where such operations are represented by the blocks shown in FIG. 3. The operations may be facilitated via instructions that may be executed by one or more processing systems (where each such processing system may include one or more processors).

In block 302, parametric data may be obtained. The obtaining of the parametric data as part of block 302 may be based on performing one or more monitoring activities, sampling, analyzing one or more reports or signals, obtaining status from a device or component, etc. The parametric data may be indicative of a health of communications or communication services facilitated by a network or system.

In block 306, the parametric data obtained as part of block 302 may be analyzed. The analysis of block 306 may be facilitated via one or more algorithms. The analysis of block 306 may be based on a use of machine learning and/or artificial intelligence. Based on the analysis, one or more non-idealities, relative to a baseline or reference configuration, may be identified as part of block 306. The baseline/reference configuration may correspond to nominal operating conditions (where nominal in this context may assume a "gold-standard" where there are no equipment or infrastructure failures and demand is within the limits of an operating envelope) or may correspond to a sub-optimal configuration (where, for example, such sub-optimal configuration may have been intentionally chosen in view of cost-of-change as described above).

In block 310, a determination may be made whether any non-idealities (determined/identified as part of block 306) warrant change. The determination of whether any changes are warranted as part of block 310 may be based on a cost of enacting those changes, which in turn may be based on a cost-of-change analysis that provides an assessment of the impact of enacting the changes (and/or the impact of not enacting the changes), a duration (actual or predicted) of the non-idealities, resource capacity (both in the near-term and allocated for future uses/growth), supply chain risk, risk to customer/subscriber loyalty, etc.

If the determination of block 310 is answered in the negative ("no"), flow may proceed from block 310 to block 302 to maintain the current configuration of the network/system and to continue obtaining parametric data. In this respect, the loop that is formed (from block 310 to block 302) may enable the method 300 to adapt to changes in conditions or circumstances or in response to one or more events. If the determination of block 310 is answered in the affirmative ("yes"), flow may proceed from block 310 to block 314.

In block 314, any changes identified as part of block 310 may be implemented, which may result in a modified configuration of a network/system. The loop that is formed (from block 314 to block 302) may enable the method 300 to adapt to changes in conditions or circumstances or in response to one or more events, and may be used to monitor the effectiveness of any changes that may be implemented as part of block 314.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. One or more blocks can be performed in response to, or based on, one or more other blocks.

Aspects and embodiments of this disclosure may leverage statistical or probabilistic models to drive decision-making logic or procedures. For example, cost-of-change analyses may leverage such models to determine/identify whether any changes to parameters, resources, equipment, UEs, etc. is warranted. To demonstrate, a configuration of a network or system may be controlled, managed, or regulated in accordance with such determinations/identifications. Further, assessments of (likely/probabilistic) impact and time duration (potentially along/over one or more time scales/frames) may be included as part of the models to facilitate one or more acts/activities described herein. One or more thresholds may be utilized as part of the decision-making logic or procedures. Aspects of this disclosure may ensure that QoS or QoE based metrics or criteria are respected, potentially as a function of a determination or identification of an application that is executed by a device (e.g., a UE), an importance of a subscriber associated with a UE, etc. Aspects of this disclosure may serve to constrain a set of options or candidates to a level that is more manageable or easier or more effective to implement. By extension, various aspects of this disclosure may serve to reject options or candidates that are too costly to implement (where cost in this context may encompass any of the criteria set forth above).

The various aspects of this disclosure tend to take a wholistic view of operations associated with a network or system, and tend to view those operations along a continuum of time. This may be contrasted with conventional perspectives that tend to view network and system planning and maintenance/management as discrete activities/disciplines, such that network/system performance may suffer over time using conventional techniques.

As the foregoing demonstrates, the various aspects of this disclosure are integrated as part of numerous practical applications involving networks and systems, inclusive of communication networks and systems. For example, by accurately capturing the cost of enacting changes across multiple time scales, decision-making logic or procedures may be enhanced/improved, which in turn may enhance or improve network/system performance over time. In this respect, and as one skilled in the art will appreciate, such enhancement/improvement in performance represents substantial improvements to technology vis-à-vis conventional techniques/technologies. In brief, and as demonstrated herein, the various aspects of this disclosure are not directed to abstract ideas. To the contrary, the various aspects of this disclosure are directed to, and encompass, significantly more than any abstract idea standing alone.

Figure 4:
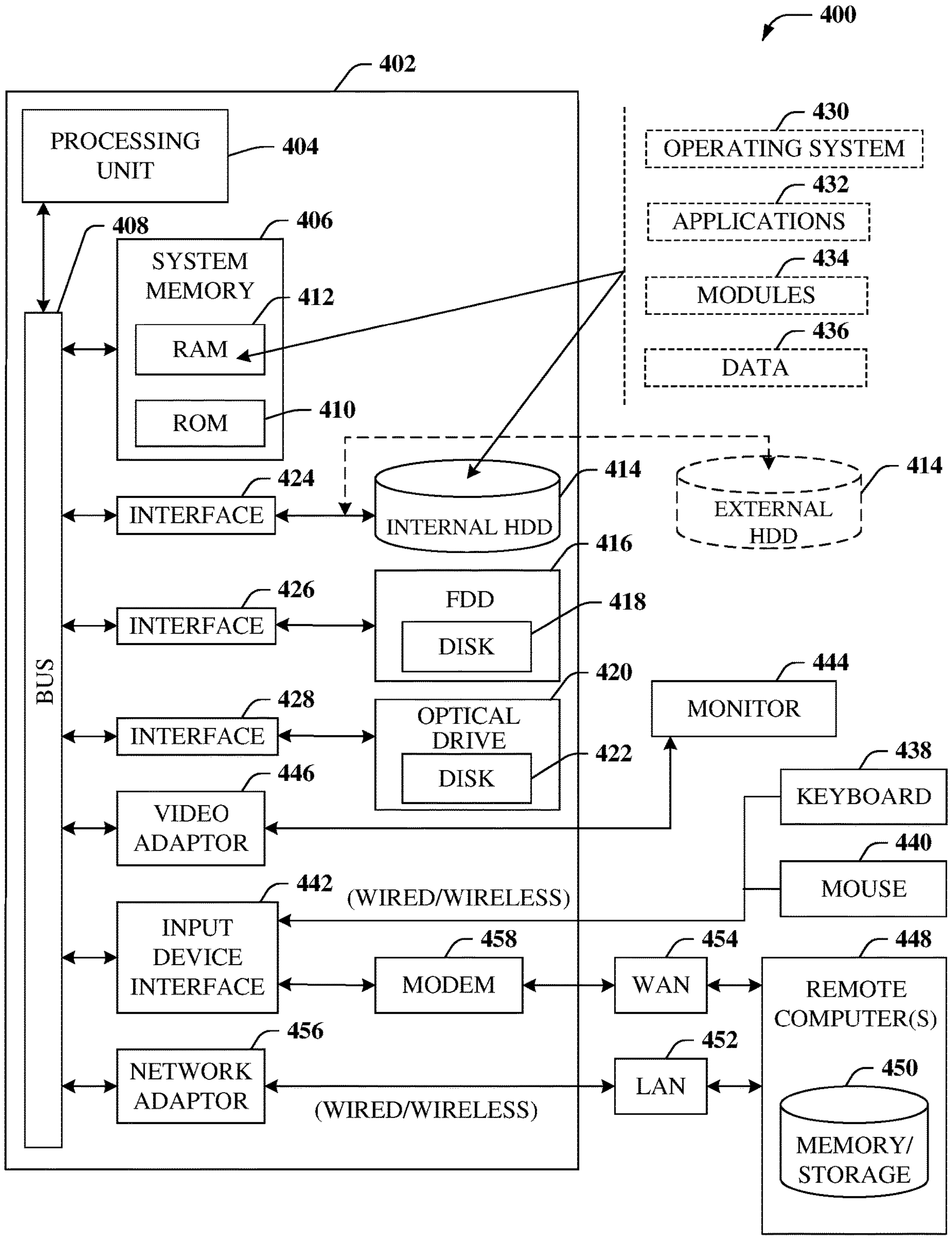
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, the computing environment 400 can be used in computing device described herein. Each of these devices can be implemented via computer-executable instructions that can run on one or more computers, and/or in combination with other program modules and/or as a combination of hardware and software. For example, the computing environment 400 can facilitate, in whole or in part, obtaining parametric data, analyzing the parametric data to identify a non-ideality with respect to a configuration of a network, performing, based on the analyzing of the parametric data, a cost-of-change analysis to identify whether one or more changes to the configuration of the network are warranted, and based on the performing of the cost-of-change analysis indicating that at least one change of the one or more changes is warranted, modifying the configuration of the network, the modifying resulting in a modified configuration of the network that is different from the configuration of the network. The computing environment 400 can facilitate, in whole or in part, determining, by a processing system including a processor, a probability of each stress of a plurality of stresses occurring within a communication network or system, determining, by the processing system, an impact of each stress of the plurality of stresses on a performance of the communication network or system if the stress was to occur within the communication network or system, determining, by the processing system, a likely duration of each stress of the plurality of stresses if the stress was to occur within the communication network or system, selecting, by the processing system and based on the probability of each stress occurring within the communication network or system, the impact of each stress if the stress was to occur within the communication network or system, and the likely duration of each stress if the stress was to occur within the communication network or system, a configuration for the communication network or system from among a plurality of configurations, and configuring the communication network or system in accordance with the configuration. The computing environment 400 can facilitate, in whole or in part, determining that a stress has been imposed on operations of a network, resulting in a first determination, wherein the stress is based on an impairment of a first resource of the network, an increase in demand in respect of a second resource of the network, or a combination thereof, analyzing, based on the first determination, a cost of changing a configuration of the network from a first configuration to a second configuration that is different from the first configuration, wherein the second configuration would mitigate an impact of the stress on a performance of the network over a first time scale, and wherein the second configuration would harm the performance of the network relative to the first configuration over a second time scale that is different from the first time scale, and determining, based on the cost, whether to modify the configuration of the network from the first configuration to the second configuration, resulting in a second determination.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
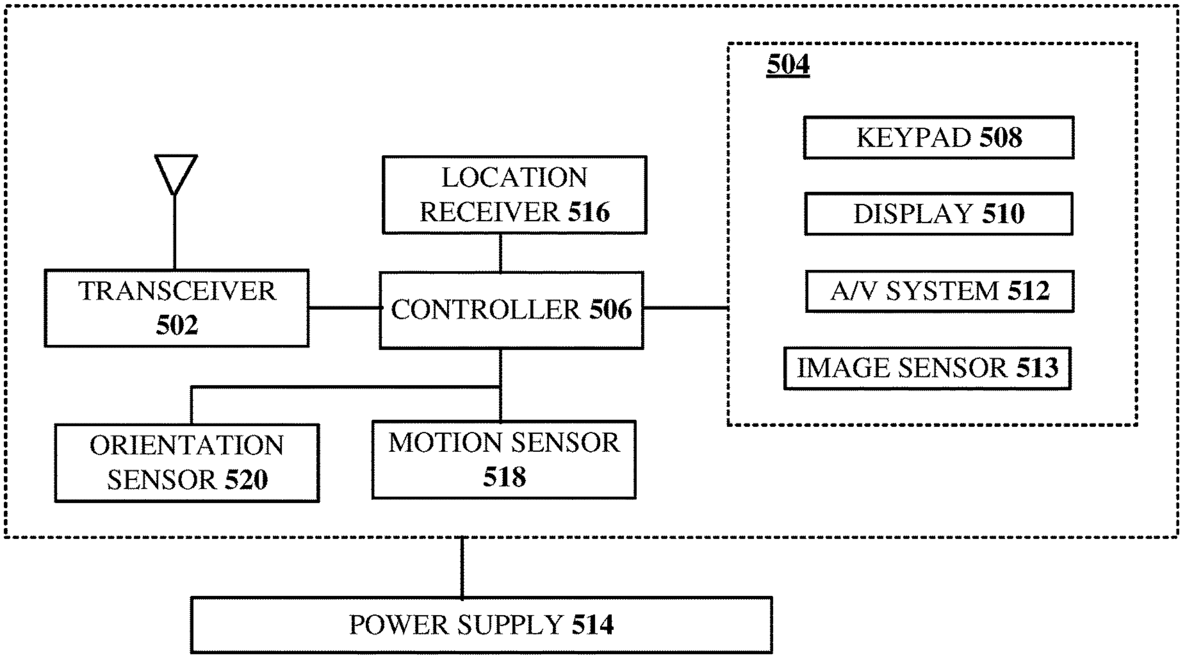
FIG. 5 is a block diagram of an example, non-limiting embodiment of a mobile network platform in accordance with various aspects described herein.

Turning now to FIG. 5, an illustrative embodiment of a communication device 500 is shown. The communication device 500 can facilitate, in whole or in part, obtaining parametric data, analyzing the parametric data to identify a non-ideality with respect to a configuration of a network, performing, based on the analyzing of the parametric data, a cost-of-change analysis to identify whether one or more changes to the configuration of the network are warranted, and based on the performing of the cost-of-change analysis indicating that at least one change of the one or more changes is warranted, modifying the configuration of the network, the modifying resulting in a modified configuration of the network that is different from the configuration of the network. The communication device 500 can facilitate, in whole or in part, determining, by a processing system including a processor, a probability of each stress of a plurality of stresses occurring within a communication network or system, determining, by the processing system, an impact of each stress of the plurality of stresses on a performance of the communication network or system if the stress was to occur within the communication network or system, determining, by the processing system, a likely duration of each stress of the plurality of stresses if the stress was to occur within the communication network or system, selecting, by the processing system and based on the probability of each stress occurring within the communication network or system, the impact of each stress if the stress was to occur within the communication network or system, and the likely duration of each stress if the stress was to occur within the communication network or system, a configuration for the communication network or system from among a plurality of configurations, and configuring the communication network or system in accordance with the configuration. The communication device 500 can facilitate, in whole or in part, determining that a stress has been imposed on operations of a network, resulting in a first determination, wherein the stress is based on an impairment of a first resource of the network, an increase in demand in respect of a second resource of the network, or a combination thereof, analyzing, based on the first determination, a cost of changing a configuration of the network from a first configuration to a second configuration that is different from the first configuration, wherein the second configuration would mitigate an impact of the stress on a performance of the network over a first time scale, and wherein the second configuration would harm the performance of the network relative to the first configuration over a second time scale that is different from the first time scale, and determining, based on the cost, whether to modify the configuration of the network from the first configuration to the second configuration, resulting in a second determination.

The communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface having graphical user interface (GUI) elements that can be selected by a user with a touch of a finger. The display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high-volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable communications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $X=(X_1, X_2, X_3, X_4 \ldots X_n)$, to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve ve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data "storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium, comprising executable instructions that, when executed by a processing system including a processor, facilitate performance of operations, the operations comprising:

obtaining parametric data;

analyzing the parametric data to identify a non-ideality with respect to a configuration of a network;

performing, based on the analyzing of the parametric data, a cost-of-change analysis to identify whether one or more changes to the configuration of the network are warranted, wherein the cost-of-change analysis encompasses a quantification of each of the one or more changes, as a function of time, in terms of benefit, risk, penalty, and cost, wherein the cost-of-change analysis is based on a change-plan that includes a sequence of element changes that are to be executed, and wherein the cost-of-change analysis identifies a worst-case impact that leaves the network at a point with a greatest performance drop relative to a baseline; and based on the performing of the cost-of-change analysis indicating that at least one change of the one or more changes is warranted, modifying the configuration of the network, the modifying resulting in a modified configuration of the network that is different from the configuration of the network.

2. The non-transitory machine-readable medium of claim 1, wherein the operations further comprise:

prior to the obtaining of the parametric data, identifying the configuration of the network as providing a first performance in a first time scale that is less than a second performance that is available via a second configuration of the network in the first time scale, resulting in a first identification;

prior to the obtaining of the parametric data, identifying the configuration of the network as providing a third performance in a second time scale that is greater than a fourth performance that is available via the second configuration of the network in the second time scale, resulting in a second identification;

based on the first identification and the second identification, selecting the configuration of the network; and based on the selecting and prior to the obtaining of the parametric data, configuring the network in accordance with the configuration of the network.

3. The non-transitory machine-readable medium of claim 1, wherein the operations further comprise:

based on the performing of the cost-of-change analysis indicating that none of the changes of the one or more changes is warranted, maintaining the configuration of the network.

4. The non-transitory machine-readable medium of claim 1, wherein the performing of the cost-of-change analysis identifies an impact of performing each of the changes of the one or more changes and an impact of performing none of the changes of the one or more changes.

5. The non-transitory machine-readable medium of claim 1, wherein the performing of the cost-of-change analysis comprises identifying a probabilistic duration of an impairment of equipment or infrastructure of the network.

6. The non-transitory machine-readable medium of claim 1, wherein the performing of the cost-of-change analysis comprises identifying a probabilistic duration of an increase in demand on resources of the network relative to at least one threshold.

7. The non-transitory machine-readable medium of claim 1, wherein the performing of the cost-of-change analysis comprises identifying a capacity of available resources in the network over a first time scale and a capacity of resources of the network in a second time scale that is subsequent to the first time scale, wherein the capacity of resources in the second time scale includes resources allocated to a future growth of the network.

8. The non-transitory machine-readable medium of claim 7, wherein the performing of the cost-of-change analysis comprises an identification of risk in acquiring the resources allocated to the future growth of the network.

9. The non-transitory machine-readable medium of claim 1, wherein the performing of the cost-of-change analysis comprises identifying a quality of service that is owed to a first user equipment that obtains access to a first communication service via resources of the network, identifying an importance of a subscriber associated with a second user equipment that obtains access to at least a second communication service facilitated via the resources of the network, or a combination thereof, wherein the first communication service is associated with an execution of an application by the first user equipment.

10. The non-transitory machine-readable medium of claim 1, wherein the performing of the cost-of-change analysis indicates that a plurality of changes of the one or more changes is warranted, and wherein the modifying of the configuration of the network comprises enacting the plurality of changes.

11. The non-transitory machine-readable medium of claim 1, wherein the network includes a fiber network, a wireless network, or a combination thereof.

12. An apparatus comprising:
a processing system including a processor; and
memory storing instructions that, when executed by the processing system, facilitate performance of operations, the operations comprising:
analyzing parametric data to identify a non-ideality with respect to a configuration of a network;
performing, based on the analyzing of the parametric data, a cost-of-change analysis to identify whether one or more changes to the configuration of the network are warranted, wherein the cost-of-change analysis encompasses a quantification of each of the one or more changes, as a function of time, in terms of benefit, risk, penalty, and cost, wherein the cost-of-change analysis is based on a change-plan that includes a sequence of element changes that are to be executed, and wherein the cost-of-change analysis identifies a worst-case impact that leaves the network at a point with a greatest performance drop relative to a baseline; and
based on the performing of the cost-of-change analysis indicating that at least one change of the one or more changes is warranted, modifying the configuration of the network, the modifying resulting in a modified configuration of the network that is different from the configuration of the network.

13. The apparatus of claim 12, wherein the operations further comprise:
prior to obtaining the parametric data, identifying the configuration of the network as providing a first performance in a first time scale that is less than a second performance that is available via a second configuration of the network in the first time scale, resulting in a first identification;
prior to obtaining the parametric data, identifying the configuration of the network as providing a third performance in a second time scale that is greater than a fourth performance that is available via the second configuration of the network in the second time scale, resulting in a second identification;
based on the first identification and the second identification, selecting the configuration of the network; and
based on the selecting and prior to obtaining the parametric data, configuring the network in accordance with the configuration of the network.

14. The apparatus of claim 12, wherein the operations further comprise:
based on the performing of the cost-of-change analysis indicating that none of the changes of the one or more changes is warranted, maintaining the configuration of the network.

15. The apparatus of claim 12, wherein the performing of the cost-of-change analysis identifies an impact of performing each of the changes of the one or more changes and an impact of performing none of the changes of the one or more changes.

16. The apparatus of claim 12, wherein the performing of the cost-of-change analysis comprises identifying a probabilistic duration of an impairment of equipment or infrastructure of the network.

17. The apparatus of claim 12, wherein the performing of the cost-of-change analysis comprises identifying a probabilistic duration of an increase in demand on resources of the network relative to at least one threshold.

18. The apparatus of claim 12, wherein the performing of the cost-of-change analysis comprises identifying a capacity of available resources in the network over a first time scale and a capacity of resources of the network in a second time scale that is subsequent to the first time scale, wherein the capacity of resources in the second time scale includes resources allocated to a future growth of the network.

19. A method comprising:
obtaining, by a processing system including a processor, data;
analyzing, by the processing system, the data to identify a non-ideality with respect to a configuration of a network;
performing, by the processing system and based on the analyzing of the data, a cost-of-change analysis to identify whether one or more changes to the configuration of the network are warranted, wherein the cost-of-change analysis encompasses a quantification of each of the one or more changes, as a function of time, in terms of benefit, risk, penalty, and cost, wherein the cost-of-change analysis is based on a change-plan that includes a sequence of element changes that are to be executed, and wherein the cost-of-change analysis identifies a worst-case impact that leaves the network at a point with a greatest performance drop relative to a baseline; and
based on the performing of the cost-of-change analysis indicating that at least one change of the one or more changes is warranted, modifying, by the processing system, the configuration of the network, the modifying resulting in a modified configuration of the network that is different from the configuration of the network.

20. The method of claim 19, further comprising:
prior to the obtaining of the data, identifying, by the processing system, the configuration of the network as providing a first performance in a first time scale that is less than a second performance that is available via a second configuration of the network in the first time scale, resulting in a first identification;
prior to the obtaining of the data, identifying, by the processing system, the configuration of the network as providing a third performance in a second time scale that is greater than a fourth performance that is available via the second configuration of the network in the second time scale, resulting in a second identification;
based on the first identification and the second identification, selecting, by the processing system, the configuration of the network; and
based on the selecting and prior to the obtaining of the data, configuring, by the processing system, the network in accordance with the configuration of the network.

* * * * *